(12) United States Patent  
Terada et al.

(10) Patent No.: US 8,581,906 B2  
(45) Date of Patent: Nov. 12, 2013

(54) IMAGE PROCESSING APPARATUS AND IMAGE PROCESSING METHOD

(75) Inventors: Munehiro Terada, Saitama (JP); Kenichi Nagai, Gunma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 733 days.

(21) Appl. No.: 12/389,152

(22) Filed: Feb. 19, 2009

(65) Prior Publication Data

US 2010/0026695 A1  Feb. 4, 2010

(30) Foreign Application Priority Data

Aug. 4, 2008 (JP) ................................ 2008-201202

(51) Int. Cl.  
*G06T 15/00* (2011.01)

(52) U.S. Cl.  
USPC ........... 345/428; 345/424; 345/581; 345/587; 345/601; 382/128; 382/130; 382/132; 382/154; 382/172

(58) Field of Classification Search  
USPC .......... 345/424, 428, 581, 587, 601; 382/128, 382/130, 132, 154, 172  
See application file for complete search history.

(56) References Cited

U.S. PATENT DOCUMENTS

| | | | |
|---|---|---|---|
| 5,712,963 A | 1/1998 | Kobayashi et al. | |
| 5,760,783 A * | 6/1998 | Migdal et al. | 345/587 |
| 6,501,482 B1 * | 12/2002 | Rosman et al. | 345/587 |
| 6,563,504 B1 * | 5/2003 | Rose et al. | 345/473 |
| 6,833,839 B2 | 12/2004 | Nair et al. | |
| 6,943,805 B2 * | 9/2005 | Snyder et al. | 345/589 |
| 7,081,893 B2 * | 7/2006 | Cerny | 345/428 |
| 7,120,311 B2 * | 10/2006 | Snyder | 382/276 |
| 7,133,041 B2 * | 11/2006 | Kaufman et al. | 345/419 |
| 7,154,509 B2 * | 12/2006 | Nair et al. | 345/601 |
| 7,471,291 B2 * | 12/2008 | Kaufman et al. | 345/424 |
| 7,626,591 B2 * | 12/2009 | Crawfis et al. | 345/587 |
| 7,768,524 B2 * | 8/2010 | Snyder et al. | 345/589 |

(Continued)

FOREIGN PATENT DOCUMENTS

| | | |
|---|---|---|
| CN | 1653513 | 8/2005 |
| EP | 1 708 507 | 10/2006 |

(Continued)

OTHER PUBLICATIONS

Chinese Patent Application No. 200910127135.3, Notification of the First Office Action, mailed Mar. 16, 2011, (English Translation).

(Continued)

*Primary Examiner* — Phu K Nguyen  
(74) *Attorney, Agent, or Firm* — Blakely, Sokoloff, Taylor & Zafman LLP

(57) ABSTRACT

According to one embodiment, an image processing apparatus includes a level storage module, an instruction receiving module, a switching module, and a resolution increasing module. The level storage module stores a super-resolution level in association with a video mode that indicates definition to display a video signal. The super-resolution level indicates intensity of super-resolution conversion, in which from a video signal having first resolution, a video signal is obtained that has second resolution higher than the first resolution. The instruction receiving module receives an instruction specifying a video mode. The switching module switches a video mode to the specified video mode. The resolution increasing module performs the super-resolution conversion at a super-resolution level corresponding to the specified video mode.

10 Claims, 5 Drawing Sheets

(56) References Cited

U.S. PATENT DOCUMENTS

| | | |
|---|---|---|
| 2004/0246268 A1 | 12/2004 | Nair et al. |
| 2005/0030386 A1 | 2/2005 | Kamieniecki |
| 2005/0160468 A1 | 7/2005 | Rodriguez et al. |
| 2005/0262444 A1 | 11/2005 | Kizaki et al. |
| 2006/0165307 A1 | 7/2006 | Kondo et al. |
| 2009/0172754 A1 | 7/2009 | Furukawa |

FOREIGN PATENT DOCUMENTS

| | | |
|---|---|---|
| JP | 07-074904 | 3/1995 |
| JP | 2002-077834 | 3/2002 |
| JP | 2005-141614 | 6/2005 |
| JP | 2006-236317 | 9/2006 |
| JP | 2007-193508 | 8/2007 |
| JP | 2008-067110 | 3/2008 |
| JP | 2008-067316 | 3/2008 |
| JP | 2008-146190 | 6/2008 |
| WO | 03096320 | 11/2003 |
| WO | WO2005020237 | 3/2005 |
| WO | WO2008085874 | 7/2008 |

OTHER PUBLICATIONS

Japanese Patent Application No. 2008-201202, Notice of Rejection, mailed Jun. 26, 2009, (English translation).

European Patent Application No. 09003454.7-1241 European Search Report mailed Nov. 6, 2009.

Japanese Patent Application No. 2009-297920, Decision to Grant a Patent, mailed Nov. 29, 2011, (with English Translation).

* cited by examiner

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2008-201202, filed Aug. 4, 2008, the entire contents of which are incorporated herein by reference.

BACKGROUND

1. Field

One embodiment of the invention relates to a technology for increasing resolution of an image and, more particularly, to an image processing apparatus that switches resolution levels and a method thereof.

2. Description of the Related Art

Recent progress in the integration of a personal computer (PC) and a television provides more opportunities to view various types of videos on a high-resolution display with high definition (HD) exceeding standard definition (SD).

Video broadcast for SD televisions, video recorded on DVD, or the like has low resolution. Therefore, when users view video in HD size (especially, in full HD size, i.e., full HD resolution of 1920×1080 pixels), the resolution of the video is increased. To increase the resolution of an image, technologies, such as linear interpolation and cubic covolution interpolation, have been used to calculate the pixel value of the image. With these technologies, however, a sharp image cannot be obtained.

In view of this, a super resolution technology has been studied, in which an image is expanded, and high-frequency component pixels are interpolated between pixels of the expanded image to obtain a sharp high-resolution image (see, for example, Japanese Patent Application Publication (KOKAI) Nos. 2008-067110 and 2008-146190). The conventional super resolution technology enhances the sharpness of video, and thus users can enjoy the sharp and clear video.

Videos having different data amounts are provided in various manners as, for example, via broadcasting including broadcasting satellite (BS) broadcasting, communication satellite (CS) broadcasting, digital terrestrial broadcasting, analog broadcasting, and via the Internet. Therefore, with the conventional super resolution technology, to enjoy more clear video, users perform a complicated operation to switch the level indicating the intensity of super-resolution processing (hereinafter, "super-resolution level") depending on provided video.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
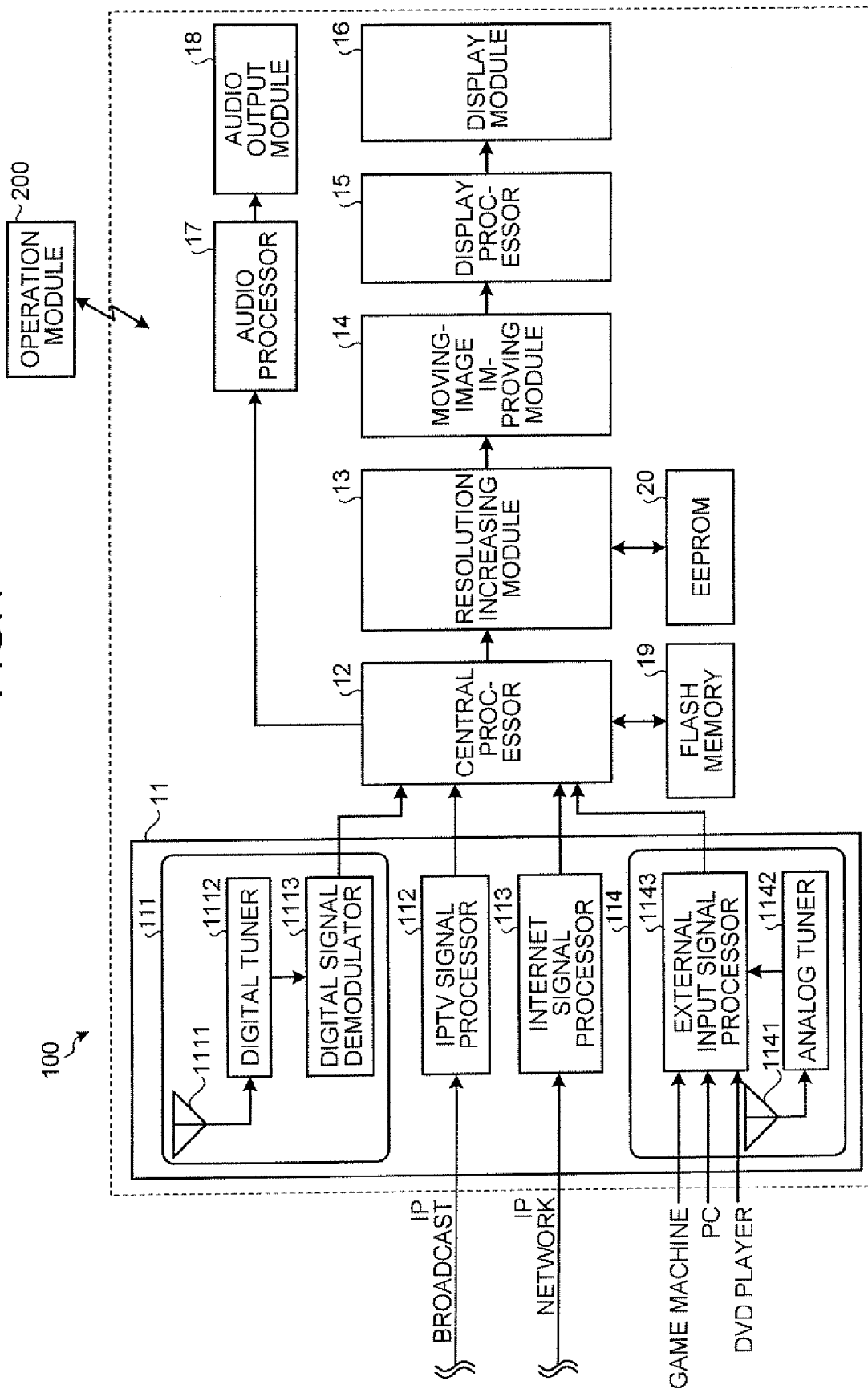
FIG. 1 is an exemplary schematic block diagram of an image display apparatus according to an embodiment of the invention.

Various embodiments according to the invention will be described hereinafter with reference to the accompanying drawings. In general, according to one embodiment of the invention, an image processing apparatus comprises: a level storage module configured to store a super-resolution level in association with a video mode that indicates definition to display a video signal, the super-resolution level indicating intensity of super-resolution conversion, in which, on receipt of a first video signal with first resolution, an original pixel value is estimated from the first video signal, and pixels are increased to obtain a second video signal with second resolution that is higher than the first resolution; an instruction receiving module configure to receive an instruction specifying a video mode; a switching module configured to switch a video mode to the video mode specified by the instruction; and a resolution increasing module configured to perform the super-resolution conversion at a super-resolution level corresponding to the video mode switched by the switching module.

According to another embodiment of the invention, an image processing apparatus comprises: a resolution increasing module configured to perform super-resolution conversion, in which, on receipt of a first video signal with first resolution, the resolution increasing module estimates an original pixel value from the first video signal, and increases pixels to obtain a second video signal with second resolution that is higher than the first resolution; a display module configured to display the second video signal obtained by the super-resolution conversion; a super-resolution level selecting module configure to receive input selecting a level of the super-resolution conversion through the display module; and a controller configured to control the resolution increasing module to perform the super-resolution conversion at the level of the super-resolution conversion.

According to still another embodiment of the invention, an image processing apparatus comprises: a level storage module configured to store a super-resolution level in association with a video mode that indicates definition to display a video signal, the super-resolution level indicating intensity of super-resolution conversion, in which a video signal with a first resolution is converted into a video signal with second resolution that is higher than the first resolution; an instruction receiving module configure to receive an instruction specifying a video mode; a switching module configured to switch a video mode to the video mode specified by the instruction; and a resolution increasing module configured to perform the super-resolution conversion at a super-resolution level corresponding to the video mode switched by the switching module.

According to still another embodiment of the invention, an image processing method comprises: storing a super-resolution level in association with a video mode that indicates definition to display a video signal, the super-resolution level indicating intensity of super-resolution conversion, in which, on receipt of a first video signal with first resolution, an original pixel value is estimated from the first video signal, and pixels are increased to obtain a second video signal with second resolution that is higher than the first resolution; receiving an instruction specifying a video mode; switching a video mode to the video mode specified by the instruction; and performing the super-resolution conversion at a super-resolution level corresponding to the video mode switched at the switching.

FIG. 1 is a schematic block diagram of an image display apparatus 100 according to an embodiment of the invention. As illustrated in FIG. 1, the image display apparatus 100 of the embodiment comprises a video signal input module 11, a central processor 12, a resolution increasing module 13, a moving-image improving module 14, a display processor 15, a display module 16, an audio processor 17, and an audio output module 18. The resolution increasing module 13 corresponds to an image processing apparatus.

The video signal input module 11 comprises a digital broadcast receiver 111, an Internet protocol television (IPTV) signal processor 112, an Internet signal processor 113, and an external input module 114. The digital broadcast receiver 111 receives an video signal to be displayed. The Internet signal processor 113 receives data transmitted through an IP network such as the Internet. The external input module 114 receives input of an analog signal. The term "video signal" as used herein includes audio signals as well as image signals such as still image signals and moving image signals.

The digital broadcast receiver 111 comprises a digital antenna 1111, a digital tuner 1112, and a digital signal demodulator 1113. The digital antenna 1111 receives digital broadcasting such as BS broadcasting, CS broadcasting, and digital terrestrial broadcasting. The digital tuner 1112 is used to select a digital broadcast channel. The digital signal demodulator 1113 demodulates a digital broadcast signal, and outputs it to the central processor 12 as a digital video signal.

The IPTV signal processor 112 receives IP broadcasting transmitted over a dedicated IP network, and outputs it to the central processor 12 as a digital video signal.

The Internet signal processor 113 receives data (still image, moving image, etc.) transmitted through an IP network such as the Internet, and outputs it to the central processor 12 as a digital video signal.

The external input module 114 comprises an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing, such as A/D conversion, on an analog signal, and outputs it to the central processor 12 as a digital video signal. The external input signal processor 1143 is provided with a terminal (not shown) for connection to an external device such as a game machine, a personal computer (PC), a digital versatile disk (DVD) player. The external input signal processor 1143 performs the signal processing also on an analog signal received from an external device through the terminal.

Figure 2:
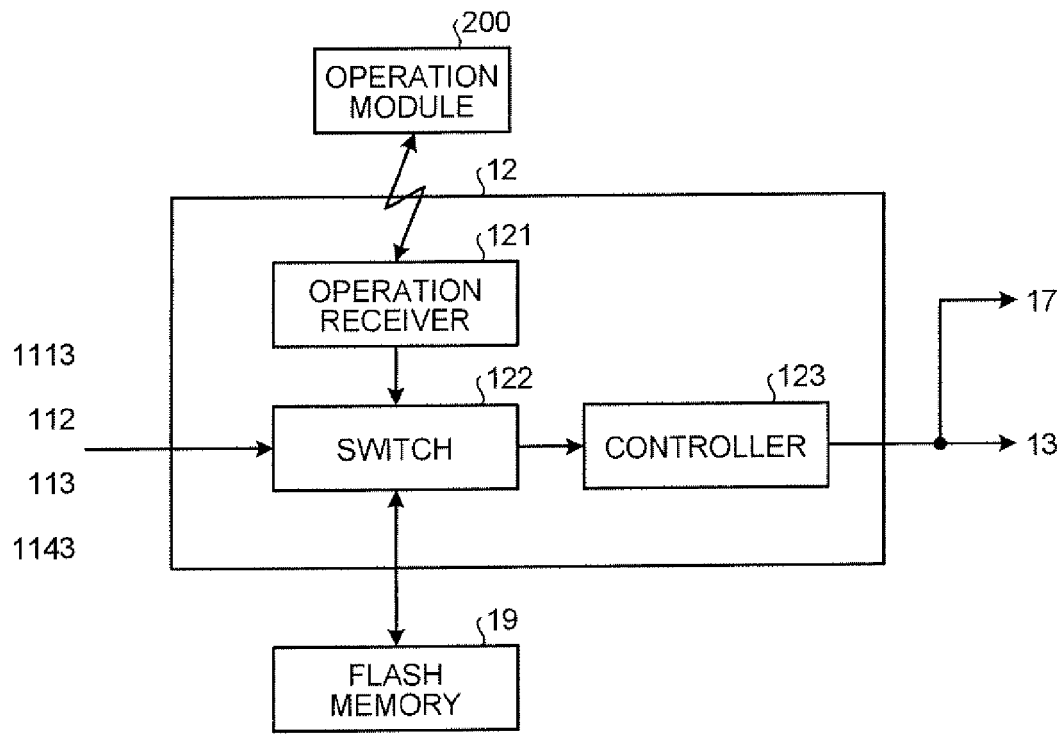
FIG. 2 is an exemplary block diagram of a central processor illustrated in FIG. 1 in the embodiment.

FIG. 2 is a functional block diagram of the central processor 12. As illustrated in FIG. 2, the central processor 12 comprises an operation receiver 121, a switch 122, a controller 123, and a flash memory 19.

The operation receiver 121 receives, as will be described later, a signal instructing a video mode (hereinafter, "instruction signal"), and outputs it to the switch 122. The video mode indicates definition to display a video signal on the display module 16 and is specified through an operation module 200. The operation module 200 may comprise a remote controller.

Figure 3:
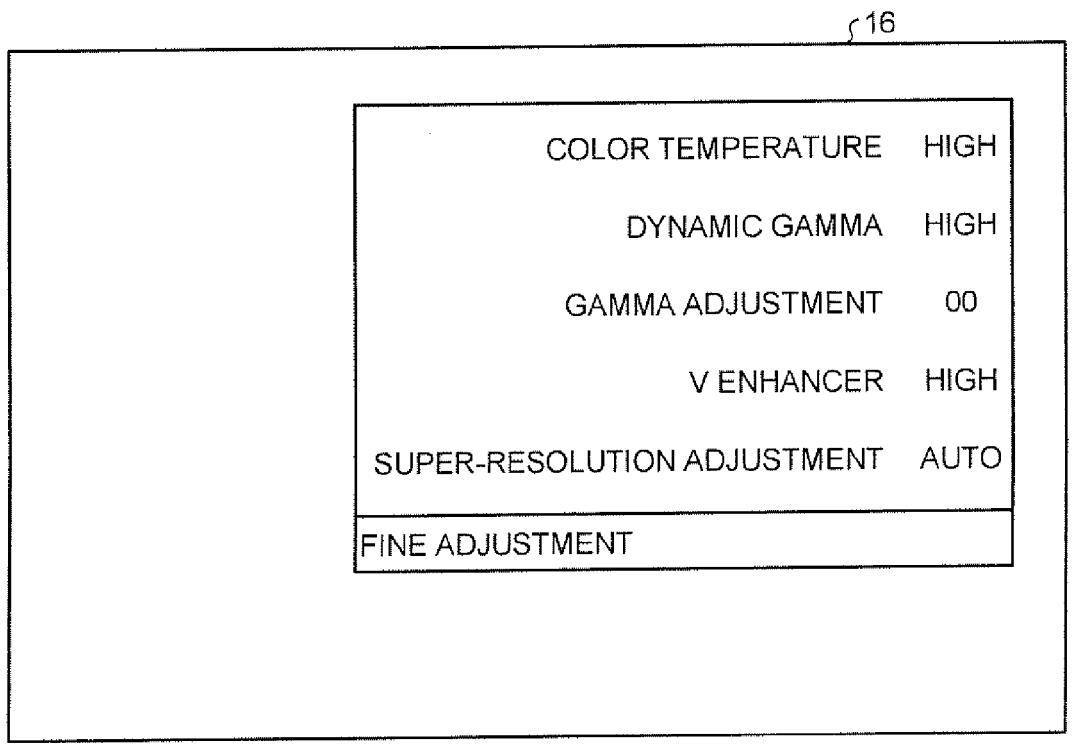
FIG. 3 is an exemplary diagram of a screen relative to image adjustment displayed on a display module via OSD in response to operation on an operation module in the embodiment.

More specifically, for example, when a user presses a setting button (not shown) relative to video display adjustment on the operation module 200, a fine adjustment screen is displayed via on screen display (OSD) as illustrated in FIG. 3. The fine adjustment screen displays a menu item "super-resolution adjustment" for adjusting the super-resolution level indicating the super-resolution intensity with various types of parameters such as color temperature setting for white balance and a gamma correction parameter. The super-resolution level represents, as will be described later, the intensity of super-resolution conversion ranked, for example, from levels 1 to 5. This eliminates the need of the user to specify a complicated super-resolution parameter.

Figure 4:
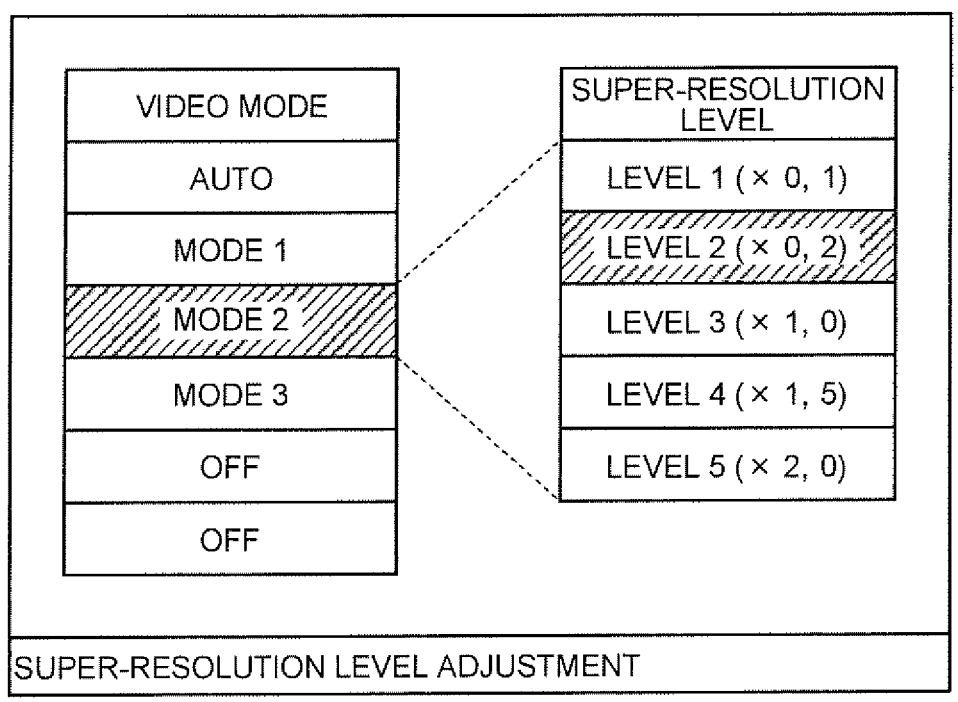
FIG. 4 is an exemplary diagram of a menu for super-resolution adjustment illustrated in FIG. 3 in the embodiment.

When the menu item "super-resolution adjustment" is selected on the fine adjustment screen displayed via OSD, a "super-resolution level adjustment menu" is displayed as illustrated in FIG. 4. The super-resolution level adjustment menu allows the user to select a video mode by, for example, pressing the setting button. The super-resolution level adjustment menu herein provides menu items "Auto", "Mode 1", "Mode 2", "Mode 3", and "Off" for super-resolution processing. When "Auto" mode is selected, the mode may automatically switches among Mode 1 to 3 according to an input video signal, or, apart from Mode 1 to 3, a parameter characteristic of the super-resolution processing may be automatically variable.

More specifically, the mode automatically switches among Mode 1 to 3 according to the noise level or the data amount of a video signal (bit rate, resolution), or a parameter characteristic of the super-resolution processing automatically varies. In Mode 1, the super-resolution processing is performed for a clear and vivid video compressed at a low compression ratio/a high bit rate with low noise, and the intensity is lower than in the other modes.

On the other hand, in Mode 3, the super-resolution processing is performed for a video compressed at a high compression ratio/a low bit rate with relatively high noise, and the intensity is higher than in the other modes. In Mode 2 between Modes 1 and 3, the super-resolution processing is performed for a standard video compressed at a moderate compression ratio/a moderate bit rate (the middle between high and low. Besides, in "Off" mode, the super-resolution processing is not performed. Accordingly, by switching between Off mode and the other modes, the user can experience the effect of the super-resolution processing.

Further, as illustrated in FIG. 4, when the user selects a video mode, a selection menu is displayed so that the user can select a super-resolution level corresponding to the video mode. Thus, the user can select a super-resolution level corresponding to each video mode by simple operation such as the pressing of a button. FIG. 4 illustrates the case where the user has selected "Mode 2" as the video mode, and has set the super-resolution level to "level 2".

Because of the preferences of individual users for video, the super-resolution processing may be performed in a reverse manner to that described above. That is, the intensity of the super-resolution processing may be higher in Mode 1 than in the other modes, while the intensity may be lower in Mode 3 than in the other modes.

Figure 5:
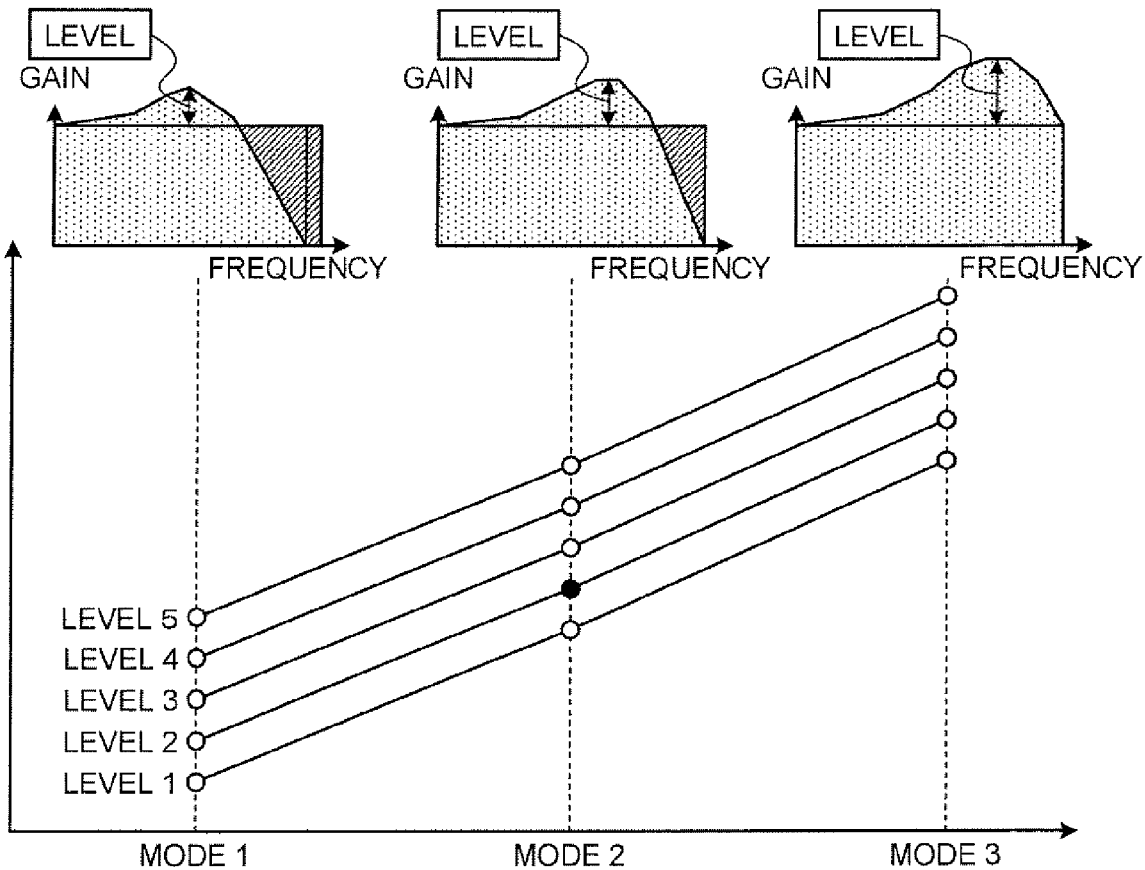
FIG. 5 is an exemplary diagram of the relationship between video modes and super-resolution levels in the embodiment.

FIG. 5 illustrates the relationship between the video modes and the super-resolution levels. As illustrated in FIG. 5, the super-resolution levels are set with respect to each of the video modes. More specifically, the video modes and the super-resolution levels are associated so that the output of the high frequency components of a video signal increases at the super-resolution levels as the video mode changes from Mode 1 through Mode 2 to . . . (Mode 1→Mode 2→ . . . ). With the super-resolution levels set for each of the video modes in such a manner, the user can finely set a super-resolution level. The video modes and the super-resolution levels are stored in a storage medium such as the flash memory 19 in association with one another.

Referring back to FIG. 2, having received a video signal from the digital signal demodulator 1113, the IPTV signal processor 112, the Internet signal processor 113, or the external input module 114, the switch 122 identifies a video mode (e.g., Mode 2) and a super-resolution level (e.g., level 2) corresponding to an instruction signal received by the operation receiver 121, and outputs them to the controller 123. The switch 122 also writes the video mode and the super-resolution level to the flash memory 19.

The controller 123 separates the video signal into an image signal and an audio signal. The controller 123 outputs the image signal subjected to predetermined image processing to the resolution increasing module 13 as well as outputting the audio signal to the audio processor 17.

Examples of the image processing that the controller 123 performs on the image signal include scaling to convert the resolution of the image signal to a predetermined value (e.g., 1280×720).

As described above, the flash memory 19 stores a video mode and a super-resolution level corresponding to an instruction signal received from the operation module 200 by the operation receiver 121 in association with each other.

Figure 6:
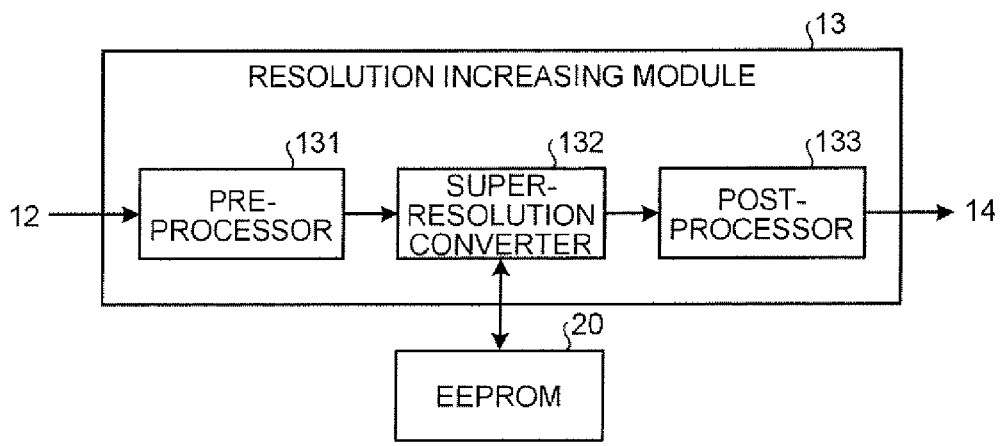
FIG. 6 is an exemplary block diagram of a resolution increasing module illustrated in FIG. 1 in the embodiment.

The resolution increasing module 13 is described below. FIG. 6 is a functional block diagram of the resolution increasing module 13. As illustrated in FIG. 6, the resolution increasing module 13 comprises a preprocessor 131, a super-resolution converter 132, a post-processor 133, and an electrically erasable programmable read-only memory (EEPROM) 20.

The preprocessor 131 performs image processing (hereinafter, "preprocessing") on the image signal received from the central processor 12, and then outputs it to the super-resolution converter 132, which will be described later. Examples of the preprocessing include interlace/progressive conversion and noise reduction to remove noise. The preprocessor 131 also receives the video mode and the super-resolution level from the central processor 12, and outputs them to the super-resolution converter 132. Incidentally, a signal relative to the video mode and the super-resolution level may be directly input to the super-resolution converter 132 without via the preprocessor 131.

More specifically, as the interlace/progressive conversion, the preprocessor 131 detects motion of an image from the image signal and determines whether the image is a still image or a moving image. When the image is a still image, the preprocessor 131 performs still-image interpolation. On the other hand, when the image is a moving image, the preprocessor 131 performs moving-image interpolation.

As the noise reduction, the preprocessor 131 corrects the contour of the image, reduces image blur and glare, suppresses excessive equalizing (high-frequency enhancement), and corrects camera shake blur caused by the horizontal movement of a camera.

The super-resolution converter 132 performs image processing (hereinafter, "super-resolution conversion") on a low-resolution frame received from the preprocessor 131 to increase the resolution, thereby generating a frame of high-resolution moving image data in HD size (hereinafter, "high-resolution frame"). The super-resolution converter 132 outputs the high-resolution frame to the post-processor 133.

The term "super-resolution conversion" as used herein refers to image sharpening, in which, from an image signal with low resolution, i.e., first resolution, an original pixel value is estimated to increase the pixels and thus to restore an image signal with high resolution, i.e., second resolution. The original pixel value refers to the value of each pixel of an image signal obtained by, for example, photographing the same object as that of an image with low resolution (first resolution) with a camera having high-resolution pixels and capable of capturing an image with high resolution (second resolution).

Besides, "original pixel value is estimated to increase pixels" means to obtain the characteristics of images to find a correlated image, and estimate an original pixel value from neighboring images (in the same frame or between frames) using the correlated image to increase pixels. The super-resolution conversion may be performed using known or commonly used technologies as disclosed in, for example, Japanese Patent Application Publication (KOKAI) Nos. 2007-310837, 2008-98803, and 2000-188680. In the embodiment, the super-resolution conversion uses a technology of, for example, restoring an image with frequency components above the Nyquist frequency determined by the sampling rate of an input image.

If employing the super-resolution conversion disclosed in Japanese Patent Application Publication (KOKAI) No. 2007-310837, the super-resolution converter 132 sets a target pixel in each of a plurality of frames of moderate resolution, and sets a target image area so that it contains the target pixel. The super-resolution converter 132 selects a plurality of correspondent points that correspond to a plurality of target image areas closest to a variation pattern of the pixel value in the target image area from the reference frame. The super-resolution converter 132 sets a sample value of luminance of a correspondent point to the pixel value of a corresponding target pixel. The super-resolution converter 132 calculates a pixel value for a high-resolution frame having more pixels than the reference frame and corresponding to the reference frame based on the size of a plurality of sample values and layout of the correspondent points. Thus, the super-resolution converter 132 estimates an original pixel value from a low-resolution image signal, and increases pixels to restore a high-resolution image signal.

If employing the super-resolution conversion using self-congruency position search in the same frame image disclosed in Japanese Patent Application Publication (KOKAI) No. 2008-98803, the super-resolution converter 132 calculates a first pixel position with the smallest error, i.e., a first error, by comparing errors of respective pixels in a search area of a frame of moderate resolution. The super-resolution converter 132 calculates a position with the smallest error in the search area with decimal precision based on the first pixel position and the first error, and a second pixel position around a first pixel and a second error thereof. The super-resolution converter 132 calculates a decimal-precision vector that has its end point at the position with the smallest error and its start point at a pixel of interest. The super-resolution converter 132 calculates an extrapolation vector of the decimal-precision vector that has its end point at a pixel on a screen which is not in the search area based on the decimal-precision vector. The super-resolution converter 132 calculates a pixel value for a high-resolution image having more pixels than an image signal based on a pixel value obtained from the image signal, the decimal-precision vector, and the extrapolation vector. In this manner, the super-resolution converter 132 estimates an original pixel value from a low-resolution image signal, and increases pixels to restore a high-resolution image signal.

The super-resolution converter 132 may employ the super-resolution conversion disclosed in Japanese Patent Application Publication (KOKAT) No. 2000-188680 using mapping between a plurality of frames.

The above technologies of the super-resolution conversion are cited by way of example and not by way of limitation The super-resolution converter 132 may employ various other technologies in which an original pixel value is estimated from a low-resolution image signal to increase pixels to thereby obtain a high-resolution image signal.

Having received an image signal on which the preprocessor 131 has performed noise reduction, etc., the super-resolution converter 132 performs the super-resolution conversion corresponding to the video mode and the super-resolution level. More specifically, the super-resolution converter 132 retrieves a super-resolution parameter corresponding to the video mode and the super-resolution level from, for example, the EEPROM 20.

The super-resolution parameter represents the intensity of the super-resolution conversion by a numeric value. For example, when more pixels having high frequency components are to be interpolated between pixels, the ratio of the high-frequency component pixels to the pixels to be interpolated with them is high, and the super-resolution parameter indicates a lager value. A larger value of the super-resolution parameter indicates a higher sharpening gain and a higher intensity of the super-resolution conversion The super-resolution parameters illustrated in FIG. 5 represents, assuming that they are set to 100 when the super-resolution conversion is performed on all pixels, the ratio of high-frequency component pixels to be interpolated to all the pixels. In this manner, the index of the super-resolution conversion is stored as a parameter. Therefore, if there is a change in the reference of the super-resolution conversion, it is possible to easily and efficiently cope with the change.

The super-resolution converter 132 performs the super-resolution conversion on an image signal based on the super-resolution parameter, and outputs it to the post-processor 133 described below.

The post-processor 133 performs image correction (hereinafter, "post-processing") such as gamma correction and white balance adjustment on the image signal received from the super-resolution converter 132, and outputs it to the moving-image improving module 14.

Referring back to FIG. 1, the moving-image improving module 14 will be described. The moving-image improving module 14 performs double-speed processing on the image signal received from the post-processor 133. More specifically, the moving-image improving module 14 converts the frame rate of a video signal transmitted at 60 frames per second (fps) to 120 fps. This reduces image blur in a portion in which an object moves horizontally, vertically, and diagonally or rotates as well as efficiently suppressing noise. Thus, a telop sequence, a sports scene with fast motion, etc. can be displayed clearly. The moving-image improving module 14 outputs the image signal subjected to the frame rate conversion to the display processor 15.

The interpolation may be performed by using an interpolation frame generated according to a commonly used method for interpolation of a frame image such as the interpolation frame generating method based on motion vector detection by block matching disclosed in Japanese Patent Application Publication (KOKAI) No. 2008-35404. In addition, the number of interpolation frames may be arbitrarily determined.

The display processor 15 comprises a driver to output an image signal to the display module 16 so that the display module 16 can display the image signal received from the moving-image improving module 14. The display processor 15 also displays the fine adjustment screen relative to video display via OSD in response to an instruction from the operation module 200.

The display module 16 comprises a display panel such as a liquid crystal display (LCD) panel, a plasma panel, or a surface-conduction electron-emitter display (SED) panel. The display module 16 displays an image signal on the screen under the control of the display processor 15.

The EEPROM 20 stores, as mentioned previously, the video mode and the super-resolution level in association with each other.

The operation module 200 may comprise a remote operation device such as a remote controller, and, in response to user input to specify a video mode, sends an instruction signal corresponding thereto to the central processor 12.

Figure 7:
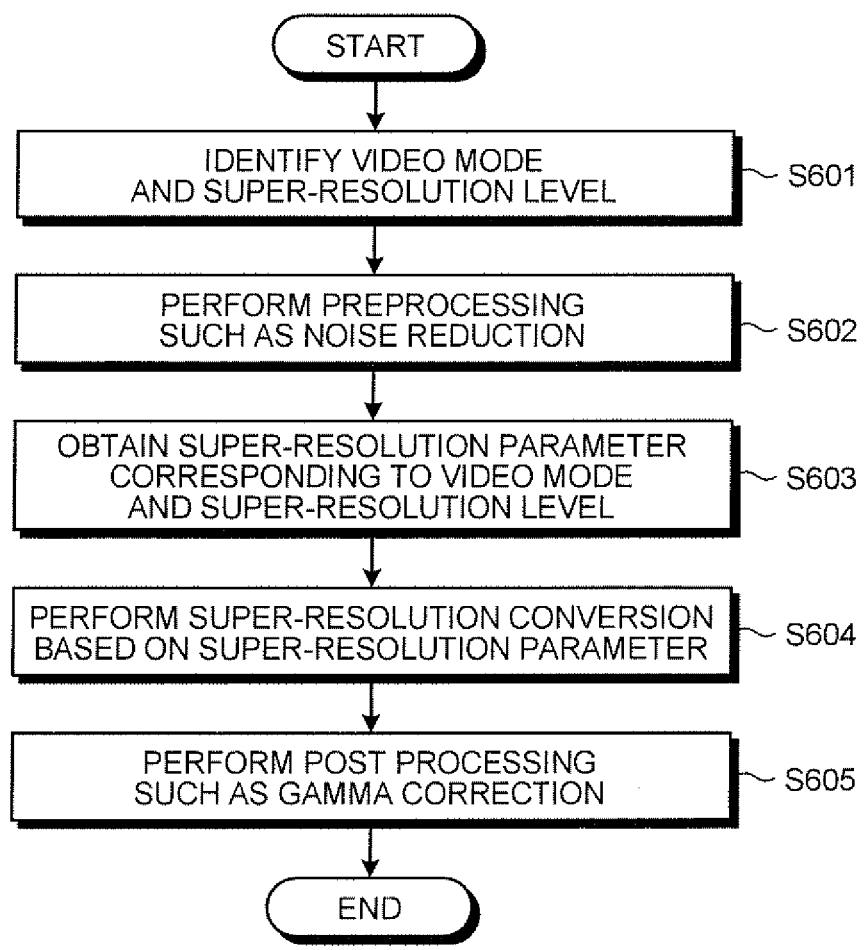
FIG. 7 is an exemplary flowchart of a super-resolution switching process in the embodiment.

Described below is the operation of the image display apparatus 100 configured as above. FIG. 7 is a flowchart of the super-resolution conversion performed by the image display apparatus 100 at a super-resolution level corresponding to a video mode specified by a user. For simplification and easy understanding, the following description assumes that a user has already specified a video mode, and a super-resolution parameter is obtained that is at a super-resolution level corresponding to the video mode. However, the video mode can be specified as required even in course of each process by an interrupt signal.

As illustrated in FIG. 7, the switch 122 of the central processor 12 identifies a video mode set by a user (S601).

The switch 122 sends the video mode with an image signal to the resolution increasing module 13. The preprocessor 131 performs image processing, such as interlace/progressive conversion and noise reduction, on the image signal, and outputs it with the video mode and a corresponding super-resolution level to the super-resolution converter 132 (S602). Incidentally, a signal relative to the video mode and the super-resolution level may be directly input from the central processor 12 to the super-resolution converter 132 without via the preprocessor 131.

After that, the super-resolution converter 132 obtains a super-resolution parameter corresponding to the video mode and the super-resolution level from the EEPROM 20 (S603).

The super-resolution converter 132 performs the super-resolution conversion on the image signal at the super-resolution level corresponding to the super-resolution parameter (S604), and outputs it to the post-processor 133. The post-processor 133 performs image correction such as gamma correction and white balance adjustment on the image signal, and outputs it to the moving-image improving module 14 (S605). The display module 16 displays the image signal under the control of the display processor 15.

As described above, the switch 122 of the central processor 12 obtains a super-resolution parameter at a super-resolution level corresponding to a video mode specified by a user. This allows the user to set a desired super-resolution level by a simple operation. Moreover, with "Auto" mode, the user can enjoy video with the super-resolution processing automatically adjusted to the optimum setting. Furthermore, with a plurality of modes such as Mode 1 to 3 and Off, the user can enjoy video with the super-resolution processing selected as he/she desires depending on the type of the video.

In the above embodiment, the super-resolution level is described as being stored in association with the video mode indicating definition to display a video signal. However, the super-resolution level may be set depending on the type of an image signal (e.g., the frequency of the image signal provided by BS broadcasting, CS broadcasting, etc.) or the type of a program (e.g., sports program, movie, etc.). In this case, the super-resolution conversion is performed based on a super-resolution parameter corresponding to the super-resolution level thus set.

The information processing apparatus of the embodiment is described as being applied to the image display apparatus 100 such as a digital TV comprising the display processor 15, the display module 16, the audio processor 17 and the audio output module 18 by way of example; however, it can be applied to, for example, a tuner or a set-top box without having those modules.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a processor;
   a memory configured to store an image-quality processing level in association with a video mode indicating a predetermined mode to display a video signal, upon receipt of a first video signal with first resolution, the image-quality processing level indicating a level of image-quality processing on the first video signal including image sharpening;
   an instruction receiving module configured to receive an instruction specifying the video mode;
   a switching module configured to switch the image-quality processing level correspondingly to the video mode specified by the instruction; and
   an image quality module configured to perform the image-quality processing at the image-quality processing level switched by the switching module;
   wherein
   the memory is configured to store a plurality of video modes and a plurality of image-quality processing levels each associated with one of the video modes,
   the instruction receiving module is configured to receive an instruction specifying one of the image-quality processing levels,
   the switching module is configured to switch the image-quality processing level to specified one of the image-quality processing levels corresponding to the video mode specified by the instruction, and
   the processor is configured to perform at least one of the instruction receiving module, the switching module and the image quality module.

2. The image processing apparatus of claim 1, wherein the image-quality processing includes resolution conversion to generate a second video signal with second resolution higher than the first resolution, and
   the switching module is configured to switch the image-quality processing level to specified one of a plurality of resolution conversion levels corresponding to the video mode specified by the instruction.

3. The image processing apparatus of claim 2, wherein the resolution conversion includes super-resolution enhancement to generate the second video signal, and
   in the super-resolution enhancement, the image quality module is configured to estimate a pixel of the second video signal and interpolate the pixel in an image with the second resolution to generate the second video signal.

4. The image processing apparatus of claim 3, wherein the memory is configured to store the video modes in association with the resolution conversion levels such that as a level of the super-resolution enhancement increases, output of the pixels having high frequency components of the second video signal increases.

5. The image processing apparatus of claim 2, wherein each of the resolution conversion levels indicates a ratio of pixels having high frequency components to pixels to be interpolated in the resolution conversion.

6. The image processing apparatus of claim 2, further comprising a display module configured to display the second video signal.

7. The image processing apparatus of claim 6, further comprising a display controller configured to control the display module to display the video mode and the image-quality processing level via on screen display.

8. An image processing method executed by an image processing apparatus, the image processing apparatus comprising:
   a processor; and
   a memory configured to store, upon receipt of a first video signal with first resolution, a video mode indicating a predetermined mode to display a video signal in association with an image-quality processing level indicating a level of image-quality processing on the first video signal including image sharpening, the memory configured to store a plurality of video modes and a plurality of image-quality processing levels each associated with one of the video modes;
   the image processing method comprising:
   receiving, by the processor, an instruction specifying the video mode and an instruction specifying one of the image-quality processing levels;
   switching, by the processor, the image-quality processing level to specified one of the image-quality processing levels corresponding to the video mode specified by the instruction; and
   performing, by the processor, the image-quality processing at the image-quality processing level switched at the switching.

9. The image processing method of claim 8, wherein the image-quality processing includes resolution conversion to generate a second video signal with second resolution higher than the first resolution, and
   the switching includes switching the image-quality processing level to specified one of a plurality of resolution conversion levels corresponding to the video mode specified by the instruction.

10. The image processing method of claim 9, wherein the resolution conversion includes a super-resolution enhancement to generate the second video signal, and
    the super-resolution enhancement includes estimating a pixel of the second video signal if the first video signal is input as the second video signal, and interpolating the pixel in an image with the second resolution to generate the second video signal.

* * * * *